United States Patent
Davis

(10) Patent No.: US 10,583,555 B2
(45) Date of Patent: *Mar. 10, 2020

(54) SYSTEM AND METHOD FOR DETERMINING TOOL OFFSETS

(71) Applicant: X Development LLC, Mountain View, CA (US)

(72) Inventor: Benjamin M. Davis, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,205

(22) Filed: Jun. 7, 2018

(65) Prior Publication Data

US 2018/0281175 A1    Oct. 4, 2018

Related U.S. Application Data

(63) Continuation of application No. 14/807,434, filed on Jul. 23, 2015, now Pat. No. 10,016,892.

(51) Int. Cl.
*B25J 9/10* (2006.01)
*G05B 19/401* (2006.01)

(52) U.S. Cl.
CPC ........ *B25J 9/1005* (2013.01); *G05B 19/4015* (2013.01); *G05B 2219/37231* (2013.01);
(Continued)

(58) Field of Classification Search
CPC ..... B25J 9/1005; Y10S 901/02; Y10S 901/41; G05B 19/4015; G05B 2219/37231; G05B 2219/39026; G05B 2219/40589
See application file for complete search history.

(56) References Cited

U.S. PATENT DOCUMENTS

| | | |
|---|---|---|
| 4,740,901 A | 4/1988 | Otsuki |
| 4,740,904 A | 4/1988 | Otsuki |

(Continued)

FOREIGN PATENT DOCUMENTS

| | | |
|---|---|---|
| DE | 69603066 T2 | 10/1999 |
| JP | S609678 A | 1/1985 |

(Continued)

OTHER PUBLICATIONS

Bonitz et al., "Calibrating a Multi-manipulator Robotic System", Robotics & Automation Magazine, IEEE, Mar. 1997.

(Continued)

*Primary Examiner* — Chun Cao
(74) *Attorney, Agent, or Firm* — McDonnell Boehnen Hulbert & Berghoff LLP

(57) ABSTRACT

Systems and methods are disclosed for determining tool offset data for a tool attached to a robot at an attachment point. In an embodiment, a method includes controlling the robot to contact a reference object with the tool. The reference object is a rigid object with a known location. A force feedback sensor of the robot indicates when the tool has contacted the reference object. Once contact is made, data indicating robot position during tool contact is received. Additionally, the robot temporarily stops movement of the tool to prevent damage to the tool or the reference object. Next, tool offset data is determined based on the position of the reference object relative to the robot and the received robot position data. The tool offset data describes the distance between at least one point on the tool and the attachment point.

18 Claims, 5 Drawing Sheets

(52) U.S. Cl.
CPC ........... *G05B 2219/39026* (2013.01); *G05B 2219/40589* (2013.01); *Y10S 901/02* (2013.01); *Y10S 901/41* (2013.01)

(56) References Cited

U.S. PATENT DOCUMENTS

| | | | |
|---|---|---|---|
| 5,471,312 | A | 11/1995 | Watanabe et al. |
| 5,929,584 | A | 7/1999 | Gunnarsson |
| 6,298,278 | B1 | 10/2001 | Pierse |
| 6,414,711 | B2 | 7/2002 | Arimatsu et al. |
| 6,836,944 | B2 | 1/2005 | Batrin |
| 7,591,078 | B2 | 9/2009 | Crampton |
| 7,684,895 | B2 * | 3/2010 | Rice ............... H01L 21/67769 318/568.16 |
| 7,979,159 | B2 | 7/2011 | Fixell |
| 8,121,732 | B2 | 2/2012 | Hashimoto et al. |
| 8,122,846 | B2 | 2/2012 | Stiblert et al. |
| 8,406,922 | B2 | 3/2013 | Nemmers et al. |
| 8,467,901 | B2 | 6/2013 | Brogardh |
| 8,588,974 | B2 | 11/2013 | Aoba et al. |
| 9,415,516 | B2 | 8/2016 | Fudaba et al. |
| 10,016,892 | B2 * | 7/2018 | Davis .................. B25J 9/1005 |
| 2003/0167103 | A1 | 9/2003 | Tang et al. |
| 2009/0033271 | A1 | 2/2009 | Hon et al. |
| 2011/0022216 | A1 | 1/2011 | Andersson |
| 2011/0107807 | A1 | 5/2011 | Sato et al. |
| 2014/0277722 | A1 | 9/2014 | Nagai et al. |
| 2015/0127141 | A1 | 5/2015 | Kawada et al. |
| 2016/0279800 | A1 * | 9/2016 | Onda .................. B25J 9/1697 |

FOREIGN PATENT DOCUMENTS

| | | | |
|---|---|---|---|
| JP | H01257593 | A | 10/1989 |
| JP | 09076178 | A | 3/1997 |
| JP | 2014176943 | A | 9/2014 |
| WO | WO 03059580 | A2 | 7/2003 |

OTHER PUBLICATIONS

Pradeep et al., "Calibrating a multi-arm multi-sensor robot: A Bundle Adjustment Approach", International Symposium on Experimental Robotics (ISER), pp. 1-3, Dec. 2010.

* cited by examiner

SYSTEM AND METHOD FOR DETERMINING TOOL OFFSETS

CROSS-REFERENCE TO RELATED APPLICATION

The present disclosure is a continuation of U.S. patent application Ser. No. 14/807,434, filed on Jul. 23, 2015, the entire contents of which are herein incorporated by reference as if fully set forth in this description.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

Example systems and methods may provide for determining tool offset data for a tool attached to a robot. The tool may be attached to the robot at an attachment point with a known location. The robot may be controlled by a control system to cause the tool to contact the reference object one or more times. The reference object may be a rigid object with a known location. Further, the reference object may include one or more flat surfaces at known locations and orientations for the tool to contact. For example, the reference object may be a plank with one flat surface that is attached to the robot at a known location with a known orientation.

A force feedback sensor of the robot may indicate when the tool has contacted the reference object. Once contact is made, the robot may temporarily stop movement of the tool to prevent damage to the tool and/or the reference object. The control system may also determine robot position data during tool contact based on encoded joint angles of the robot. Tool offset data may then be determined based on the robot position data and the position of the reference object relative to the robot. The tool offset data may describe the distance between one or more points on the tool and the attachment point. For example, the tool offset data may describe a height of the tool.

In one example, a method is provided that includes determining a position of a reference object relative to a robot. The method may also include controlling the robot such that a tool connected to the robot at an attachment point contacts the reference object during a first contact event. The method may additionally include receiving robot position data indicative of a position of the robot when the tool contacts the reference object during the first contact event. The method may also include determining tool offset data for the tool based on at least the position of the reference object relative to the robot and the robot position data, wherein the tool offset data for the tool describes a distance between the attachment point and at least one point on the tool.

In an additional example, a non-transitory computer readable medium is provided that stores instructions that are executable by one or more computing devices. When the instructions are executed, the instructions cause the one or more computing devices to perform functions that include determining a position of a reference object relative to a robot. The functions may also include controlling the robot such that a tool connected to the robot at an attachment point contacts the reference object during a first contact event. The functions may also include receiving robot position data indicative of a position of the robot when the tool contacts the reference object during the first contact event. The functions may also include determining tool offset data for the tool based on at least the position of the reference object relative to the robot and the robot position data, wherein the tool offset data for the tool describes a distance between the attachment point and at least one point on the tool.

In another example, a system is disclosed that includes a processor and a memory that stores instructions that are executed by the processor. When executed, the instructions cause the system to perform functions that include determining a position of a reference object relative to a robot. The functions may also include controlling the robot such that a tool connected to the robot at an attachment point contacts the reference object during a first contact event. The functions may also include receiving robot position data indicative of a position of the robot when the tool contacts the reference object during the first contact event. The functions may also include determining tool offset data for the tool based on at least the position of the reference object relative to the robot and the robot position data, wherein the tool offset data for the tool describes a distance between the attachment point and at least one point on the tool.

In a further example, a system may include means for determining a position of a reference object relative to a robot. The system may also include means for controlling the robot such that a tool connected to the robot at an attachment point contacts the reference object during a first contact event. The system may additionally include means for receiving robot position data indicative of a position of the robot when the tool contacts the reference object during the first contact event. The system may also include means for determining tool offset data for the tool based on at least the position of the reference object relative to the robot and the robot position data, wherein the tool offset data for the tool describes a distance between the attachment point and at least one point on the tool.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
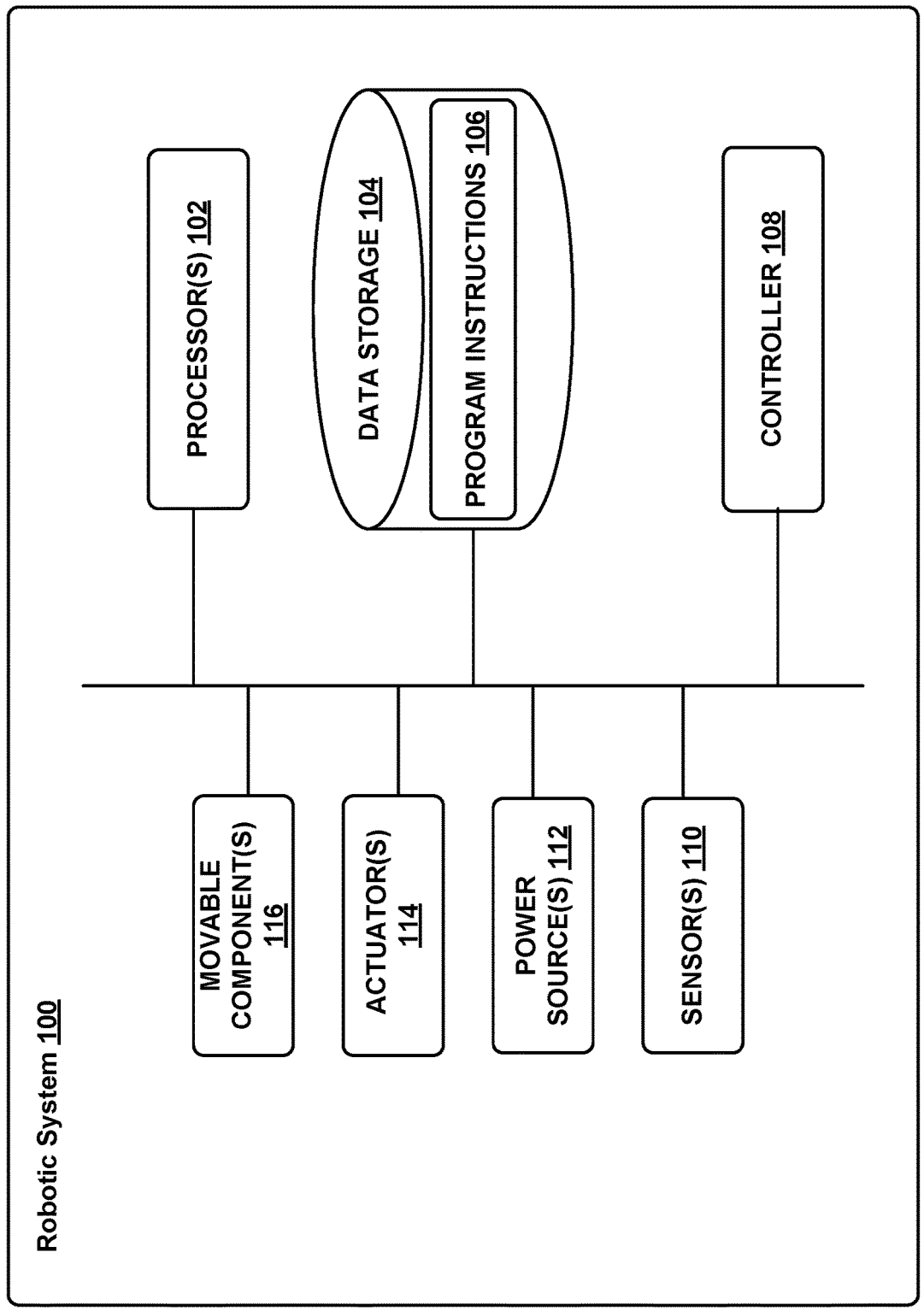
FIG. 1 illustrates an example configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

A common problem for controlling robots to execute tasks is the determination of tool offsets. For example, a user may want to control a robot with an attached tool or end effector to execute one or more tasks. The user may attach a certain type of tool to the robot based on the task to be executed. In this case, the user may know the location of the attachment point where the selected tool is attached to the robot. Additionally, the user may also know the type of tool that is attached to the robot.

However, the user may lack knowledge regarding the geometry of the attached tool. Alternatively, the user may only approximately know the location of the attachment point. In either scenario, the user may want to determine the offset between a point on the tool and the attachment point to improve control of the robot and the attached tool to execute a task. The offset may be the distance between the point on the tool and the attachment point. In some cases, the offset may be the tool height. Alternatively, the offset may describe distances between the attachment point and other points on the tool. The tool offset may be described using various dimensions, including distances in the X direction, the Y direction, and the Z direction, as well as an angular offset, such as theta.

Typically, the tool offset is manually entered by the user into a robot control system for precise and accurate control of the robot and the attached tool to execute the task. However, one issue with manual entry of tool offset data is that it requires the user to measure the offset correctly. Another issue is that the user must know a method for measuring the tool offset precisely and accurately. Yet another issue is that the offset of the tool may change over time as the tool is used (e.g., tool bends, warps, or wears down over time). Thus, an automated process performed by the robot to determine tool offset data may eliminate problems associated with manual measurement and determination of tool offsets.

A robot may perform an automated process to determine tool offset data after a tool has been attached to the robot. First, the robot may identify a rigid structure to serve as a reference object. Next, the robot may make contact with the reference object with the attached tool. The robot may collect robot position data based on the attached tool contacting the reference object. Based on the robot position data, the robot may determine a portion of tool offset data. The robot may then iteratively continue to contact the rigid reference object with the tool to acquire more robot position data. Based on the additional robot position data, the robot may determine additional tool offset data for a point on the tool. In some embodiments, the robot may iteratively contact rigid object with the tool to determine tool offset data for multiple points of interest on the tool. In one embodiment, the robot may iteratively contact the rigid object with the tool to accumulate enough robot position data to generate a 3-D model of the attached tool.

The reference object may be a rigid structure that allows the robot to make contact with the attached tool to accumulate robot position data to determine tool offset data. The reference object may be attached to the robot at a known place. For example, the reference object may be a plank located on the robot at a known location. The reference object may be a plank with two surfaces, with the first reference object surface located at an angle to the second reference object surface. For another example, the reference object may be tooling balls located on the robot at a known location. The reference object may be placed on the robot at a location such that the reference object does not interfere with the operations of the robot. Alternatively, the reference object may be at a remote location (i.e., not on the robot). The remote location of the reference object may be known by the robot. Other reference objects and reference object locations are also possible. The relative location of the reference object with respect to the robot may be used in combination with robot position data to determine tool offset data.

When the robot makes contact with reference objects, the robot may collect robot position data to determine tool offset data and improve robot control. The robot position data may provide information about the position, location, and/or orientation of the robot, the robot arm, the robot tool, the reference object, and/or other parts of the robot. For example, the robot may determine the attachment point position and angular orientation during contact based on the robot's encoded joint angles. In other embodiments, the robot position data may include other information. The collected robot position data may be used to determine a portion or all of the tool offset data. Sensors, such as an IMU, may be used to acquire the robot position data. The sensors may be attached to the robot.

Force sensing data may be acquired by the robot from a force feedback sensor located on the robot. For example, the force feedback sensor may provide force sensing data indicating that the robot tool has made contact with the reference object. This indication may prevent damage to the tool and/or the robot by negating excessive and/or unnecessary contact between the robot and the reference object. The force feedback sensor may be located at the attachment point. However, other locations for the force feedback sensor are also possible. The sensor provides precise and accurate measurements indicating when a force is exerted on the robot at the attachment point, which indicates contact between the attached tool and the reference object. Accurate and precise measurements from the force sensor enable accurate and precise determination of tool offset data.

The robot may allow various types of tools to be attached to the robot. In one embodiment, the robot includes a syringe attached to a robot arm to execute tasks involving delivering fluid stored within the syringe. A point of interest for the syringe tool may be the tip of the needle of the syringe. This point may allow the robot to determine how to control the robot arm and the attached syringe to execute the tasks involving delivering fluid stored within the syringe.

Another tool that may be attached to the robot may be a 2-finger parallel gripper. The gripper may execute tasks involving picking up, holding, and setting down objects. The fingers of the gripper may articulate towards each other and away from each other to grip and/or release objects. The gripper may have multiple points of interest to determine various gripper dimensions for controlling the gripper. For example, the points of interest for the gripper may include a point on an inner surface for each finger, a point on an outer surface for each finger, a point on an inner surface of the gripper that connects the inner surfaces of the fingers, and a point on an end surface connecting the inner and outer surfaces for each finger.

The points on the inner surfaces for each finger may be used to determine an inner width of the fingers of the gripper. The points on the outer surfaces for each finger may be used to determine an outer width of the fingers of the gripper. The point on the inner surface of the gripper that connects the inner surfaces of the fingers, and the point on the end surfaces of the fingers of the gripper may be used to determine a finger length of the gripper. The finger length and inner width of the gripper may be used to determine which objects can be grabbed by the gripper. The gripper may be actuated between a maximum inner width and a minimum inner width to accumulate robot position data during these two states. The robot position data may then be used to determine the maximum and minimum inner widths. Other points of interest on the gripper may also be determined to calculate other dimensions of the gripper.

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2A:
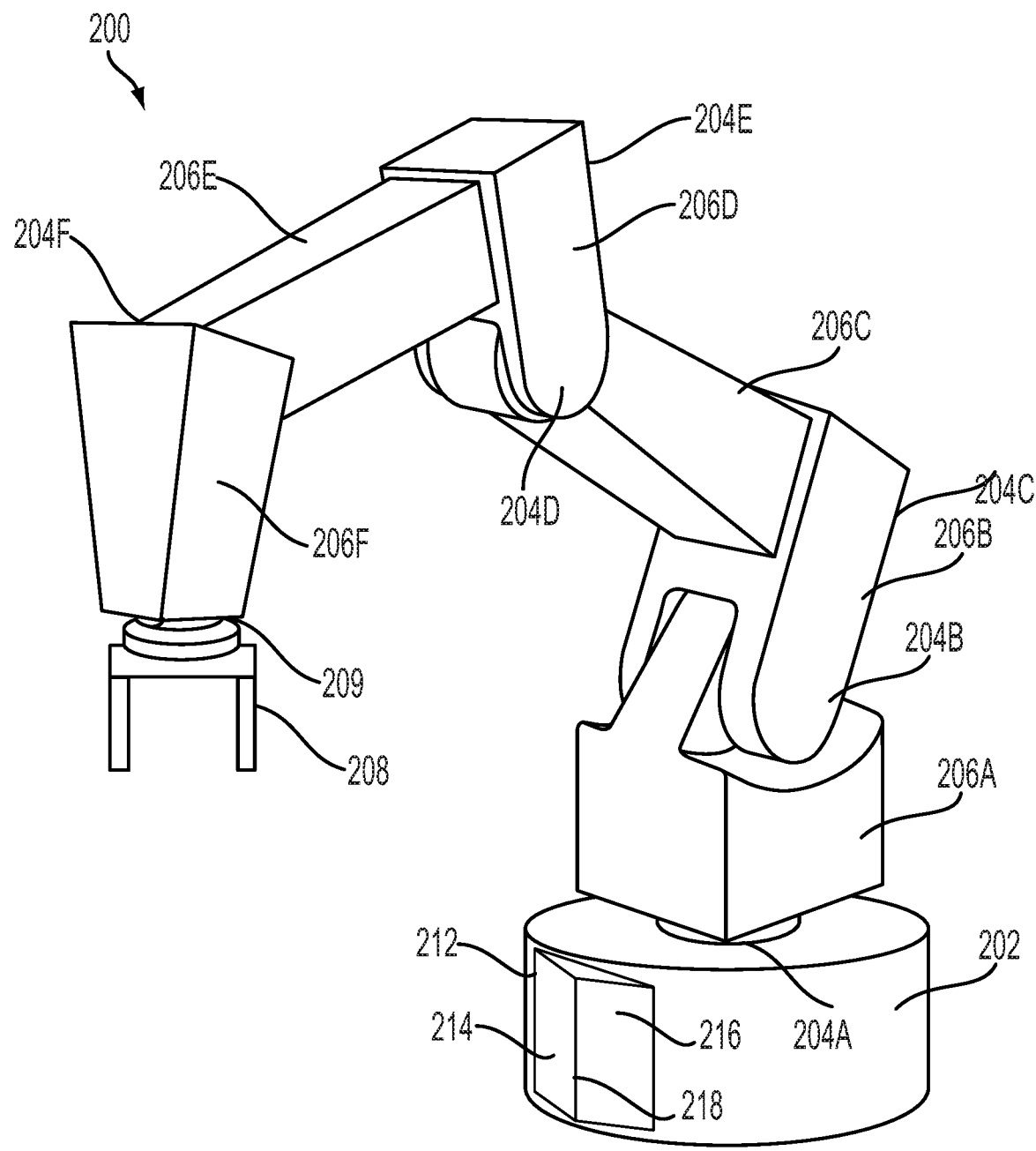
FIG. 2A illustrates an example robotic arm, according to an example embodiment.
Figure 2B:
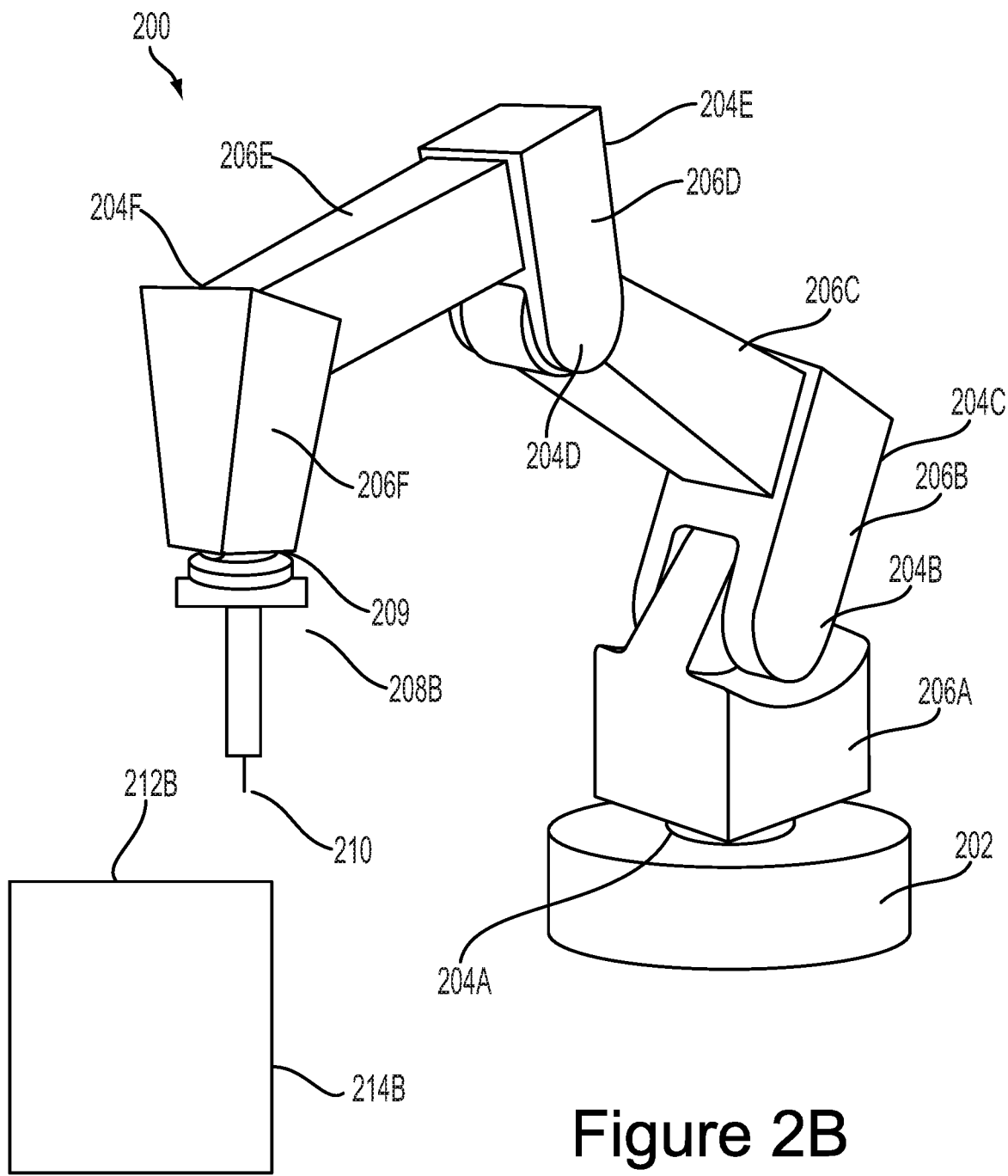
FIG. 2B illustrates another example robotic arm, according to an example embodiment.

A robotic system 100 may take on various forms. To illustrate, FIGS. 2A and 2B show an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a 2-finger parallel gripper, as shown in FIG. 2A, a different type of finger gripper, or a different type of gripper such as a suction gripper. In another example, effector 208B may take the form of a syringe, as shown in FIG. 2B, or some other tool (e.g., drill, brush, etc.). The syringe 208B may have a point of interest 210 located at the end of the needle of the syringe. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

In FIGS. 2A and 2B, the tool 208 (or tool 208B) may be a gripper, a syringe, or some other type of tool attached to robotic arm 200. The tool 208 may be attached to the arm 200 at attachment point 209. Attachment point 209 represents a location where a tool 208 can be connected to a part of a robot 100, such as the robotic arm 200. The location of the attachment point 209 may be known by robot 100. Alternatively, the attachment point 209 may be partially known or unknown by robot 100. In some embodiments, the attachment point 209 represents the location where tool 208 may be attached to a different part of robot 100.

FIG. 2A displays a reference object 212 that includes a first surface 214 and a second surface 216. The first surface 214 and second surface 216 are connected together at an angle to create edge 218. The surfaces 214 and 216, along with the edge 218, protrude out away from the appendage 206A of the robotic arm 200. The reference object 212 in FIG. 2A may include more or fewer surfaces than what is shown. Additionally, the surfaces of reference object 212 may be connected at a different angle than what is shown in FIG. 2A. Although the displayed surfaces of the reference object are flat, in other embodiments, the surfaces of the reference object 212 may be a different shape, such as concave, convex, or some other shape.

FIG. 2B displays a reference object 212B that includes a first surface 214B that is flat. The reference object 212B is located at a remote location from the robotic arm 200 in FIG. 2B. In contrast, the reference object 212 in FIG. 2A is connected to the robotic arm 200 at base 202. In other embodiments, the reference object may be connected to a different part of a robot, or connected to the robotic arm 200 at a different location.

Reference object 212 (or 212B) may be used by robot 100 to determine a tool offset for the tool 208. In some embodiments, the robot 100 may automatically identify the reference object. In other embodiments, the reference object may be inputted into the robot 100. The reference object may be a rigid structure (e.g., a plank) with a predetermined position and orientation. The reference object position and/or orientation may be described relative to the robot 100.

Furthermore, the one or more surfaces of the reference object may be located at a predetermined position with a predetermined orientation. Additionally, the surfaces of the reference object may generate one or more edges and one or more angles. Information about the orientation, position, and/or angles, of the reference object, the reference object surfaces, and the reference object edges may be inputted into the robot 100. The reference object position relative to the robot may be used with robot position data to determine tool offset data.

Reference object position information may be described using one or more dimensions, such as a first dimension in the X direction, a second dimension in the Y direction, and a third dimension in the Z direction for an XYZ coordinate system. In other embodiments, other information about the reference object may be inputted into the robot 100. In some embodiments, the robot 100 may determine the position and orientation of the reference object if the position and/or orientation of the reference object is unknown.

The reference object may be a rigid structure located at a position that doesn't interfere with robot operations, such as movement of robot arm 200. While the reference object may be a plank, the reference object may be a different item, such as a tooling ball. Furthermore, reference object could include one or more planks, one or more tooling balls, or some other items. Other types of reference objects may also be possible.

Robot 100 may execute a method to determine a tool offset for a tool 208 attached to the robot 100 at a location, such as the attachment point 209, of the robot arm 200. The tool offset may describe a distance between the attachment point 209 and at least one point on the tool 208. The tool offset may be expressed as a location with one or more dimensions. For example, the tool offset may be described using one or more dimensions, such as a first dimension in the X direction, a second dimension in the Y direction, and a third dimension in the Z direction for an XYZ coordinate system. Other dimensions, such as an angular offset $\theta$, may also be possible.

In some cases, the robot 100 may determine the tool offset data based on a known location of an attachment point to determine the location of a point of interest on the tool. Alternatively, the robot 100 may determine the tool offset data based on a known geometry of the tool to determine a more precise location of the attachment point. In this scenario, once the precise location of the attachment point is determined, the robot 100 may then determine the location of one or more points of interest on the tool with respect to the robot 100 based on the determined, precise location of the attachment point.

The robot 100 may execute a method to determine tool offset as an automated startup procedure when a new tool is attached to a part of the robot 100, such as robotic arm 200. Alternatively, the tool offset determination method could be executed as part of a troubleshooting method. For example, if an error or unexpected results occur during operation of the tool 208, the robot 100 may execute an automated tool offset determination method to correct the error and/or unexpected results.

Even further, the robot 100 may execute a tool offset determination method as an automated maintenance procedure. For example, a tool's dimensions may change over time due to wear and tear from prior use, bending, warping, and/or other reasons. As a result, executing the tool offset determination method periodically can account for tool dimension changes so that the robot is operating the tool 208 with an accurate and precise tool offset. In other embodiments, the robot 100 may execute an automated tool offset determination method for other reasons.

An automated tool offset determination method may provide several improvements over manual entry of a tool offset into robot 100. First, the automated method may be more accurate and precise than manual entry. Second, the automated method may be quicker, more efficient, and less work for the user to execute than manual entry. Third, an automated procedure may be a consistent tool offset determination procedure regardless of the user, whereas manual entry may vary based on the user. Fourth, an automated tool offset determination process means a user does not need to know an accurate and precise method for measuring the tool offset. Other benefits may also exist from executing an automated procedure for determining tool offset.

The robot 100 may begin executing the tool offset determination method by identifying the reference object. Next, the robot 100 may move the robotic arm 200 to contact the reference object 212 with the tool 208 and obtain robot position data and force sensing data during the contact event. The robot 100 may then determine a portion of tool offset data based on the robot position data. The robot 100 may continue to determine additional portions of tool offset data by iteratively generating contact events and acquiring robot position data and force sensing data during the contact events. The determined portions of tool offset data may then be used to determine locations of one or more points of interests relative to the robot. One or more dimensions and/or tool offsets may then be determined based on the locations of the points of interest. The dimensions and points of interest that are determined may vary based on the tool type (e.g., grippers, syringes, drills, brushes, etc.).

Figure 3A:
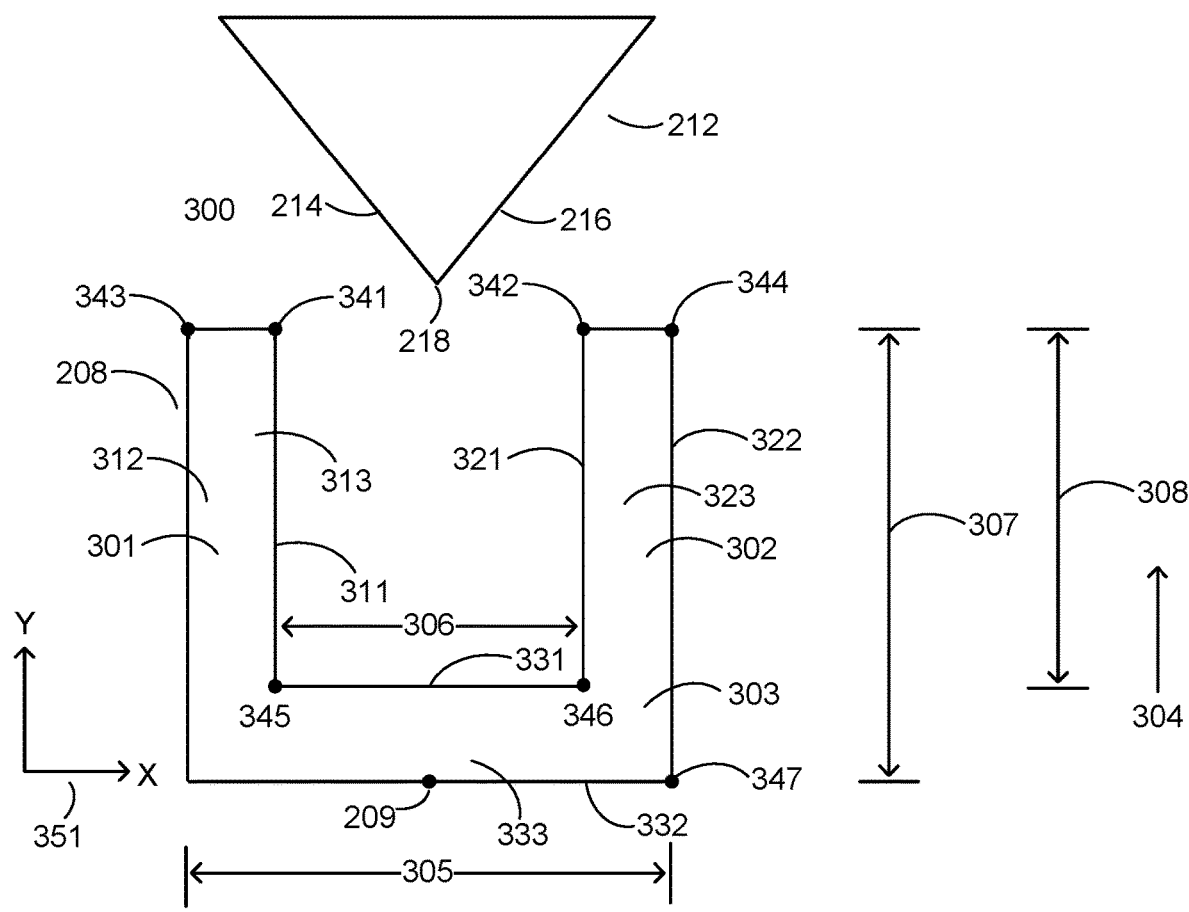
FIG. 3A is a top view of an example end effector and reference object, according to an example embodiment.
Figure 3B:
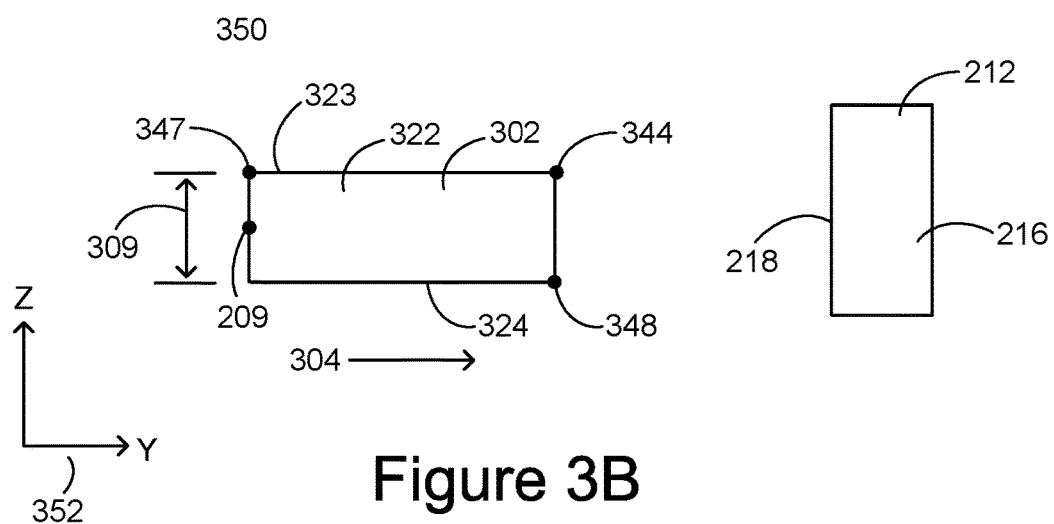
FIG. 3B is a side view of an example end effector and reference object, according to an example embodiment.

FIG. 3A displays a top view 300 of an example tool 208 (from FIG. 2A) and reference object 212, which includes surfaces 214 and 216, and edge 218. FIG. 3B displays a side view 350 of the same example tool 208 (from FIG. 2A) and reference object 212. The tool 208 is a 2-finger parallel gripper. In the displayed embodiment, various points of interests are displayed for the gripper that can be calculated to determine various dimensions and/or tool offsets.

In the displayed embodiment of FIGS. 3A and 3B, the gripper 208 includes a first finger 301, a second finger 302, a connecting portion 303, and attachment point 209. The gripper 208 is moved along an actuation direction 304 towards reference object 212. Some of the dimensions of the gripper that may be calculated include an outer width dimension 305, an inner width dimension 306, an outer length dimension 307, an inner length dimension 308, and a height dimension 309. The gripper 208 may have other dimensions that are calculated.

The first finger 301 includes an inner surface 311, an outer surface 312, and a top surface 313. Similarly, the second finger 302 includes an inner surface 321, an outer surface 322, a top surface 323, as well as a bottom surface 324.

Furthermore, the connecting portion 303 includes an inner surface 331, an outer surface 332, and a top surface 333. Each finger and/or connecting portion may include more and/or different surfaces than those described above.

The gripper 208 also includes various points of interest. The points of interest include a first point 341 of the first finger 301, a second point 343 of the first finger 301, a first point 342 of the second finger 302, a second point 344 of the second finger 302, and a third point 348 of the second finger 302. The connecting portion 303 also includes a first point 345, a second point 346, and a third point 347 for the gripper 208. Other points of interest for the gripper 208 may also be possible.

For the first finger 301, the first point 341 is located at the corner where the top surface 313 and inner surface 311 of the first finger 301 intersect. The second point 343 is located at the corner where the top surface 313 and the outer surface 312 of the first finger 301 intersect. For the second finger 302, the first point 342 is located at the corner where the top surface 323 and the inner surface 321 intersect. The second point 344 is located at the corner where the top surface 323 and the outer surface 322 of the second finger 302 intersect. The third point 348 is located at the corner where the outer surface 322 and the bottom surface 324 of the second finger 302 intersect.

For the connecting portion 303, the first point 345 is located at the corner where the inner surface 331 of the connecting portion 303 and the inner surface 311 of the first finger 301 intersect along the top surface 333 of the connecting portion 303. The second point 346 is located at the corner where the inner surface 331 of the connecting portion 303 and the inner surface 321 of the second finger 302 intersect along the top surface 333 of the connecting portion 303. The third point 347 is located at the corner where the outer surface 322 of the second finger 302 and the outer surface 332 of the connecting portion 303 intersect along the top surface 333 of the connecting portion 303.

In order to execute accurate and precise control of the gripper 208, the robot 100 may determine dimensions and tool offsets based on various points of interest for the gripper 208. For example, dimensions 305-309 may be determined by robot 100 based on one or more points of interest 341-348. In particular, the outer width dimension 305 may be determined based on the locations of points 343 and 344. The inner width dimension 306 may be calculated based on the locations of points 341 and 342 (or 345 and 346). The outer length dimension 307 may be determined based on the locations of points 344 and 347. The inner finger length dimension 308 may be determined based on points 341 and 345 (or points 342 and 346). The height dimension 309 may be determined based on the locations of points 344 and 348. The locations for each of the points may be determined by the robot 100 by executing a tool offset determination method for the point of interest.

FIGS. 3A and 3B include legends 351 and 352, which display the X, Y, and Z directions for an XYZ coordinate system. In the displayed embodiment, width dimensions 305 and 306 may describe a distance along the X direction. Additionally, length dimensions 307 and 308 may describe a distance along the Y direction. Further, the direction of actuation 304 may also be along the Y direction. Also, the height dimension 309 may describe a distance along the Z direction. However, in other embodiments, the dimensions may describe distances along different directions.

As part of the automated process for determining tool offsets, the robot 100 may control the tool 208 to generate one or more contact events by having the tool 208 contact the reference object 212. A contact event occurs when the tool 208 connected to robot 100 is moved such that the tool 208 contacts the reference object 212. During the contact event, the robot 100 may collect data, including robot position data, force sensing data, and or other information. The robot 100 may move the tool 208 to contact the reference object 212 one or more times, including at least a first contact event.

When the tool 208 contacts the reference object 212, the robot may stop movement of the tool 208, thus allowing the tool 208 to remain in contact with the reference object 212 and collect data. The robot 100 may then move the tool 208 to a position where the tool 208 is no longer in contact with the reference object 212. The contact event begins when the tool 208 first makes continuous contact with the reference object 212 and ends when the continuous contact with the reference object 212 ceases. However, in other embodiments, the contact event may be defined differently.

Force sensing data is acquired by the robot 100 via a force feedback sensor. The force feedback sensor may be located on the robot at the attachment point 209, or at some other point on the robot 100. The force feedback sensor is used to provide an indication of when the tool 208 is in contact with the reference object 212. The sensor may be designed to be sensitive to forces incurred by the sensor so that precise and accurate measurements of contact events can be taken. Precise and accurate measurements of contact events enables the robot to determine precise and accurate tool offsets, which in turn enables precise and accurate control of tool 208.

Once the force feedback sensor receives data indicating that the tool 208 is in contact with the reference object 212, the sensor allows the robot 100 to stop movement of the tool 208 while the robot 100 gathers data. By pausing movement of the robot, the force sensor helps prevent the tool 208, the reference object 212, the robot 100, and the robotic arm 200 from incurring any additional damage due to repetitive or excessive contact.

In an alternative embodiment, an indication of a contact event may correspond with a contact event electrical circuit being made (or broken). Specifically, a contact event electrical circuit may be made (or broken) when the tool 208 contacts the reference object 212. Thus, an indication of the contact event electrical circuit being made (or broken) may correspond with a contact event beginning by the tool 208 contacting the reference object 212. When the contact event ends (i.e., the tool 208 is no longer in contact with the reference object 212), the contact event electrical circuit may return to its original state of open (or closed). Other embodiments for determining a contact event may also be possible.

During the contact event, the robot 100 may also obtain robot position data indicating the position of the robot during the contact event. The robot position data may be determined based on encoded joint angles of the robot during the contact event. The encoded joint angles, and/or other information, may allow the position, location, and/or orientation of the robot 100, robotic arm 200, attachment point 209, or other parts of the robot to be determined. In order to obtain the robot position data, an IMU sensor attached to the robot 100 may be used. The robot position data may be used in combination with the position of the reference object relative to the robot to determine a portion of the tool offset data.

By generating one or more contact events, a portion of the tool offset data may be determined for tool 208. The tool offset data may be determined based on the acquired robot position data, the position of the reference object relative to the robot, and in some cases, previously determined tool offset data. Other factors may also affect the determination of tool offset data.

Outer length dimension 307 can be determined using tool offset data for points 344 and 347 with respect to attachment point 209. In the displayed embodiment, the location of attachment point 209 is known by robot 100. The attachment point 209 may be located at roughly the center of the outer surface 332 of the connecting portion 303. Additionally, the location and orientation of reference object 212, surfaces 214 and 216, and edge 218 are known by the robot 100. Therefore, tool offset data for points 344 and 347 can be determined based on the known locations and orientations for attachment point 209 and reference object 212.

Tool offset data for a point may be described as a point (X, Y, Z) on an XYZ coordinate system relative to the attachment point 209. Tool offset data determination for a point may include determining each of the three tool offset dimensions (X, Y, and Z) for the particular point relative to the attachment point 209. A tool offset dimension for a particular point relative to the attachment point can be determined by orienting the gripper such that moving the gripper along the actuation direction 304 to generate a contact event allows calculation of the tool offset dimension based on robot position data.

For example, determining tool offset data for point 347 includes determining tool offset dimensions X, Y, and Z for point 347 relative to attachment point 209. The tool offset X dimension for point 347 can be determined by moving the gripper 208 along direction 304 such that the outer surface 322 of the second finger 302 contacts edge 218 of reference object 212 during a contact event. Additionally, the tool offset Y dimension for point 347 can be determined by moving the gripper 208 along direction 304 such that the outer surface 332 of the connecting portion 303 contacts edge 218 of reference object 212 during a contact event. Further, the tool offset Z dimension for point 347 can be determined by moving the gripper 208 along direction 304 such that the top surface 323 of the second finger 302 contacts edge 218 of reference object 212 during a contact event.

The tool offset dimensions X, Y, and Z for a particular point can be calculated during a contact event. In particular, for a contact event in which the gripper is being moved along direction 304, which corresponds to the Y direction, a particular tool offset dimension can be determined based on the reference object location, the attachment point location, and the part of the gripper 208 that contacts the reference object. Specifically, the magnitude of the tool offset dimension equals the difference in the Y coordinates of the locations of the reference object and attachment point during the contact event. The particular dimension being determined depends on which surface of the gripper is contacting the reference object 212 during the contact event.

For example, for point 347, the tool offset X dimension is calculated during a contact event where the outer surface 322 of the second finger 302 contacts edge 218 of reference object 212. The magnitude of the tool offset X dimension equals the difference of the Y coordinates of the locations of the edge 218 and attachment point 209 during the contact event. The robot 100 may determine the location of attachment point 209 during the contact event. In some embodiments, the location of the attachment point 209 is determined based on encoded joint angles during the contact event. As mentioned earlier, robot 100 already knows the location of reference object 212, including edge 218. During this contact event, the difference in the Y coordinates equals half of the outer width dimension 305 (i.e., W/2). Thus, the tool offset X dimension for point 347 relative to the attachment point 209 is W/2.

Additionally, the tool offset Y dimension is calculated during a contact event where the outer surface 332 of the connecting portion 303 contacts edge 218 of reference object 212. During this contact event, the difference in the Y coordinates of the edge 218 of the reference object 212 and the attachment point 209 equals zero. Thus, the tool offset Y dimension for point 347 relative to the attachment point 209 is zero.

Further, the tool offset Z dimension is calculated during a contact event where the top surface 323 of the second finger 302 contacts edge 218 of reference object 212. During this contact event, the difference in the Y coordinates of the edge 218 of the reference object 212 and the attachment point 209 equals half of the height 309 of the gripper 208 (i.e., H/2). Thus, the tool offset Z dimension for point 247 relative to the attachment point 209 is H/2. Therefore, the tool offset data for point 347 relative to attachment point 209 equals (W/2, 0, H/2).

Tool offset data for point 344 relative to attachment point 209 can be determined in a manner similar to the tool offset data determination of point 347 described above. Once tool offset data for points 344 and 347 are determined, the outer length dimension 307 of the gripper 208 can be calculated. Similarly, the tool offset data for the other points of interest 341-348 can be determined relative to attachment point 209. The calculated tool offset data can then be used to determine gripper dimensions 305-309.

In some embodiments, the robot 100 may search for the reference object 212 with the tool 208 before beginning a contact event. The robot 100 may move the tool 208 based on the known location and orientation of the reference object to search for the reference object. Once the robot 100 has searched for, found, and contacted the reference object 212 with the tool 208, the contact event may begin.

For example, when the robot is determining tool offset data for point 347 relative to attachment point 209, the robot 100 may control the tool 208 to contact the reference object 212 at edge 218. However, the tool may contact the reference object 212 initially at surfaces 214 or 216. Thus, the robot 100 may have to control the tool 208 to search for the edge 218.

Because the robot 100 knows the location and orientation of the reference object 212, the robot 100 can search for edge 218 by moving tool 208 along the surfaces 214 and/or 216 until the edge 218 is found The robot 100 knows that the edge 218 has been found once it senses the angular transition between surface 214 and surface 216. Once the robot is contacting edge 218, the contact event may begin. The robot may collect robot position data and force sensing data before moving the tool to end contact with edge 218. Other types of searching by tool 208 may also be possible.

Because reference object 212 includes angled surfaces 214 and 216, the robot may use different types of contact events to determine tool offset data. For example, the robot 100 may control gripper 218 to generate one contact event at two points of the reference object 212 to determine a particular dimension of the gripper. Specifically, robot arm 200 may generate a contact event by moving gripper 208 to have point 341 contact surface 214 and point 342 contact surface 216 simultaneously. During this contact event, the robot 100 may obtain robot position data to determine the inner width dimension 306 of the gripper 208.

Gripper 208 may initially be moved along direction 304 towards reference object 212. After the gripper 208 contacts reference object 212, the gripper may search the reference object so that point 341 contacts surface 214 and point 342 contacts surface 216 simultaneously. In particular, the gripper 208 may move the gripper 208 around the reference object 212 until the proper points are contacting the proper surfaces. Once point 341 is contacting surface 214 and point 342 is contacting surface 216 simultaneously, the robot 100 may stop movement of the gripper 208 and obtain robot position data.

The obtained robot position data may be used in combination with a known reference object location and orientation to determine the inner width dimension 306 of the gripper 208. Specifically, the robot position data may rely on encoded joint angles to determine the position of attachment point 209 during the contact event. Based on the determined attachment point position, the reference object location and orientation, and previously obtained tool offset data (e.g., outer length dimension 307 of the gripper 208), the robot may then determine the location of point 341 during contact with surface 214 and the location of point 342 during contact with surface 216. Using these determined locations, the robot can then calculate the inner width dimension 306 of the gripper 208. In other embodiments, the robot 100 may use different tool offset determination methods to obtain different tool offset data.

The points of interest used for tool offset determination are dependent on the type of tool 208 attached to the robot 100. For example, in FIG. 2B, the robotic arm 200 of robot 100 is displayed with a syringe as the end effector 208B. Unlike the 2-finger parallel gripper, the point of interest 210 for the syringe is the tip of the needle. The robot 100 can execute a tool offset determination method to determine the location of point 210 relative to the attachment point 209. Determination of tool offset data for point 210 allows for accurate and precise control of the syringe 208B by the robot 100.

The robot 100 may determine tool offset data for point 210 of the syringe 208B using a method similar to the one described for point 347. In particular, the tool offset data for the point 210 is determined relative to the attachment point 209. Tool offset dimensions X, Y, and Z are determined for point 210 relative to the attachment point 209. Although the needle of syringe 208 doesn't have surfaces like gripper 208, the robotic arm 200 can rotate to appropriate orientations to allow the different portions of the syringe needle to contact the reference object 212 during contact events such that the tool offset dimensions X, Y, and Z can be measured for point 210. Other tool types and points of interest may also be possible for tool offset data determination.

In other embodiments, the robot may iteratively generate multiple contact events to continuously obtain tool offset data for a tool. In one embodiment, the robot iteratively generates enough contact events to determine enough tool offset data for enough points of interest to generate a 3-D model of the attached tool. Other embodiments of the tool offset determination method are also possible.

Figure 4:
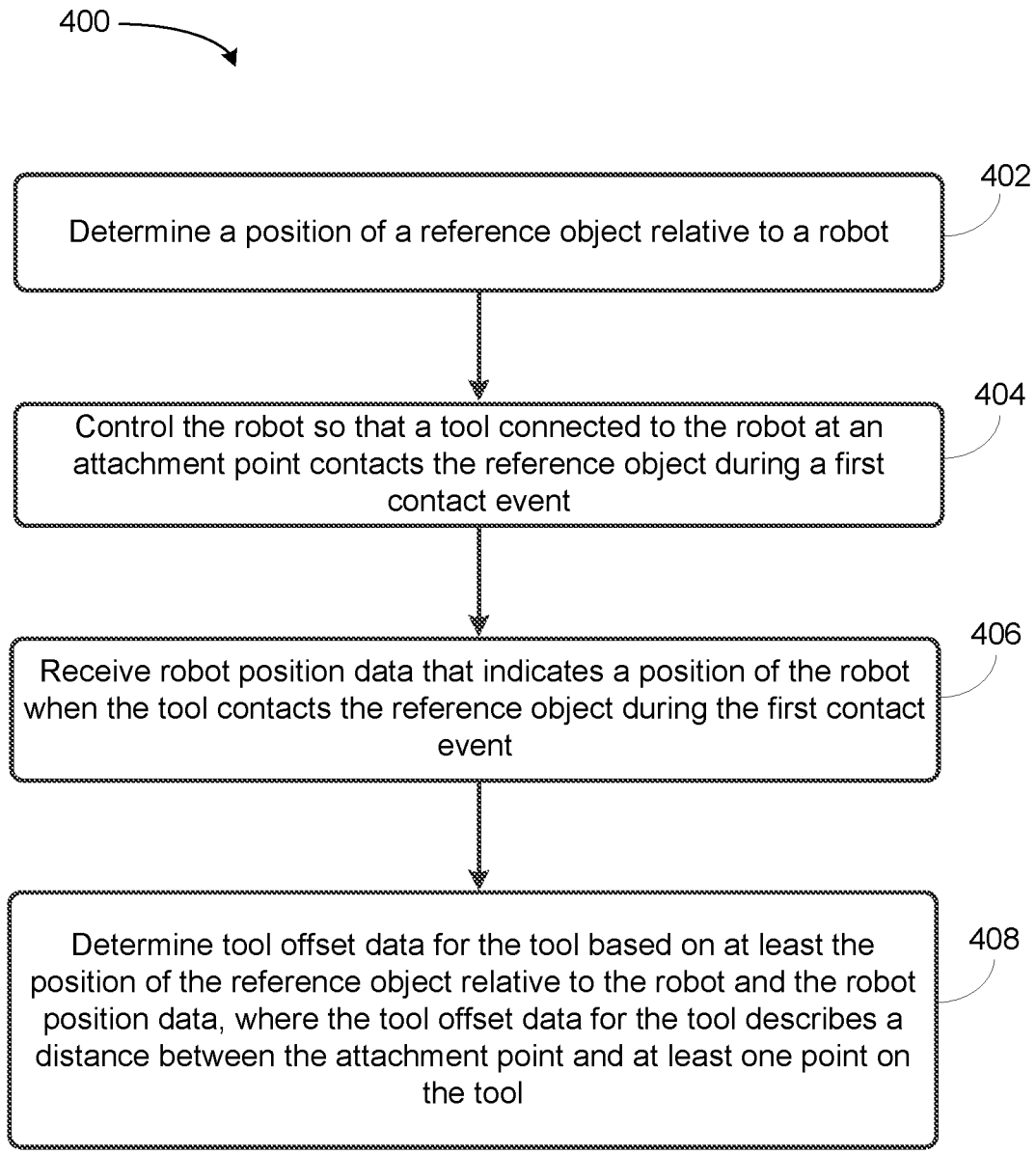
FIG. 4 is a block diagram of an example method, according to an example embodiment.

FIG. 4 illustrates a flowchart showing the method 400 that may allow for determining a tool offset, according to an example embodiment. The method 400 may be carried out by a robot, such as the robot illustrated and described with respect to FIG. 1. However, a robot control system, or some other device, that is different from the robot described in FIG. 1 may also execute method 400.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 4. Where used, program code can be stored on any type of computer-readable medium, for example, such as a storage device including a disk or hard drive.

In addition, each block of the flowchart shown in FIG. 4 may represent circuitry that is wired to perform the specific logical functions in the process. Unless specifically indicated, functions in the flowchart shown in FIG. 4 may be executed out of order from that shown or discussed, including substantially concurrent execution of separately described functions, or even in reverse order in some examples, depending on the functionality involved, so long as the overall functionality of the described method is maintained.

As shown by block 402 of FIG. 4, method 400 may involve determining a position of a reference object relative to a robot. In some examples, the reference object may be a rigid structure having one or more flat surfaces. In additional examples, the reference object may be at a remote location from the robot, or attached to the robot.

Method 400 may further involve controlling a robot so that a tool connected to the robot at an attachment point contacts the reference object during a first contact event, as shown by block 404 of FIG. 4. In some examples, the tool connected to the robot may be a 2-finger parallel gripper, a syringe, a drill, a brush, or some other tool. In additional examples, the attachment point location may be known, partially known, or unknown by the robot.

Method 400 may also involve receiving robot position data that indicates a position of the robot when the tool contacts the reference object during the first contact event, as shown by block 406 of FIG. 4. In some examples, the robot position data may be determined based on encoded joint angles of the robot during the first contact event. In additional examples, the encoded joint angles may be used to determine the position, location, or orientation of the robot and/or the robot parts.

Method 400 may additionally involve determining tool offset data for a tool based on at least the position of the reference object relative to the robot and the robot position data, where the tool offset data for the tool describes a distance between the attachment point and at least one point on the tool, as shown by block 408 of FIG. 4. In some examples, the tool offset data may describe a dimension of the tool (e.g., tool length) based on the distance between a point of interest on the tool and the attachment point. In additional examples, there may be multiple points of interest for a tool where tool offset data can be determined, such as the 2-finger parallel gripper. In further examples, there may only be one point of interest where tool offset data is determined, such as for a syringe. In an additional example, the point of interest of the syringe for which tool offset data is determined may be the end of the needle of the syringe.

Various applications and environments using robots with attached tools are possible for the disclosed systems and methods. For example, some environments where tool offset determination for robots with attached tools may be applicable include manufacturing facilities, mailing or shipping facilities, airports, hospitals, or other environments employing robots with attached tools. Furthermore, other applications where tool offset determination for robots with attached tools may be applicable include construction, shipping, manufacturing, healthcare, and/or other applications using robots with attached tools. Other applicable environments and applications for the disclosed systems and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   based on a position of a reference object on a robot, causing the robot to move a tool toward the reference object on the robot;
   determining that the tool has contacted the reference object on the robot during a first contact event;
   receiving robot position data indicative of a position of the robot when the tool contacts the reference object on the robot during the first contact event;
   determining an attachment point of the tool on the robot based on the position of the reference object on the robot and the robot position data; and
   subsequently controlling the robot to execute a task involving operation of the tool based on the determined attachment point.

2. The method of claim 1, wherein the reference object is a plank having a first flat surface at a predetermined orientation and a predetermined position, wherein the tool contacts the first flat surface of the plank during the first contact event.

3. The method of claim 1, wherein the reference object has a first flat surface and a second flat surface, wherein the first flat surface is located at an angle to the second flat surface.

4. The method of claim 1, further comprising:
   controlling the robot such that the tool contacts the reference object during a second contact event;
   receiving robot position data indicative of a position of the robot when the tool contacts the reference object during the second contact event; and
   determining tool offset data for the tool based on at least the position of the reference object on the robot and the robot position data received during the second contact event.

5. The method of claim 1, further comprising:
   iteratively causing a plurality of contact events corresponding to a plurality of different robot positions by causing the tool to contact the reference object;
   receiving robot position data indicative of the plurality of different robot positions corresponding to the plurality of contact events; and
   determining a three-dimensional model of the tool based on the received robot position data.

6. The method of claim 1, further comprising:
   receiving force sensing data from a force sensor on the robot;
   based on the force sensing data, determining that the robot has contacted the reference object with the tool; and
   in response to determining that the robot has contacted the reference object with the tool, causing the robot to stop moving the tool.

7. The method of claim 1, wherein the robot position data comprises encoded joint angles of the robot.

8. The method of claim 1, wherein the robot comprises a robot arm on top of a base, and wherein the reference object on the robot is attached to the base.

9. A non-transitory computer-readable medium storing instructions that are executable by one or more computing devices, wherein executing the instructions causes the one or more computing devices to perform functions comprising:
   based on a position of a reference object on a robot, causing the robot to move a tool toward the reference object on the robot;
   determining that the tool has contacted the reference object on the robot during a first contact event;
   receiving robot position data indicative of a position of the robot when the tool contacts the reference object on the robot during the first contact event;
   determining an attachment point of the tool on the robot based on the position of the reference object on the robot and the robot position data; and
   subsequently controlling the robot to execute a task involving operation of the tool based on the determined attachment point.

10. The non-transitory computer-readable medium of claim 9, wherein the functions further comprise:
    controlling the robot such that the tool contacts the reference object during a second contact event;
    receiving robot position data indicative of a position of the robot when the tool contacts the reference object during the second contact event; and
    determining tool offset data for the tool based on at least the position of the reference object on the robot and the robot position data received during the second contact event.

11. The non-transitory computer-readable medium of claim 9, wherein the functions further comprise:
    iteratively causing a plurality of contact events corresponding to a plurality of different robot positions by causing the tool to contact the reference object;
    receiving robot position data indicative of the plurality of different robot positions corresponding to the plurality of contact events; and
    determining a three-dimensional model of the tool based on the received robot position data.

12. The non-transitory computer-readable medium of claim 9, wherein the functions further comprise:
    receiving force sensing data from a force sensor on the robot;
    based on the force sensing data, determining that the robot has contacted the reference object with the tool; and
    in response to determining that the robot has contacted the reference object with the tool, causing the robot to stop moving the tool.

13. The non-transitory computer-readable medium of claim 9, wherein the robot position data is determined based at least on encoded joint angles of the robot.

14. A system comprising:
    a processor; and
    a memory storing instructions that when executed by the processor cause the system to perform functions comprising:
    based on a position of a reference object on a robot, causing the robot to move a tool toward the reference object on the robot;
    determining that the tool has contacted the reference object on the robot during a first contact event;
    receiving robot position data indicative of a position of the robot when the tool contacts the reference object on the robot during the first contact event;
    determining an attachment point of the tool on the robot based on the position of the reference object on the robot and the robot position data; and
    subsequently controlling the robot to execute a task involving operation of the tool based on the determined attachment point.

15. The system of claim 14, wherein the reference object is a plank having a first flat surface at a predetermined orientation and a predetermined position, wherein the tool contacts the first flat surface of the plank during the first contact event.

16. The system of claim 14, wherein the memory stores instructions that when executed by the processor further cause the system perform functions comprising:
- determining that a status of a contact electrical circuit of the robot has changed;
- based on the determined status change, determining that the robot has contacted the reference object with the tool; and
- in response to determining that the robot has contacted the reference object with the tool, causing the robot to stop moving the tool.

17. The system of claim 14, wherein the robot position data is determined based at least on encoded joint angles of the robot.

18. The system of claim 14, wherein the robot comprises a robot arm on top of a base, and wherein the reference object on the robot is attached to the base.

* * * * *